United States Patent [19]

LeGros et al.

[11] Patent Number: 5,669,411
[45] Date of Patent: Sep. 23, 1997

[54] COMPRESSOR VALVE

[76] Inventors: Brian J. LeGros, 303 Shenandoah, Broussard, La. 70518; Bernard S. Smith, 202 Wood Oak Cir., Lafayette, La. 70506

[21] Appl. No.: 572,076

[22] Filed: Dec. 14, 1995

[51] Int. Cl.$^6$ .................................... F16K 15/00
[52] U.S. Cl. ...................... 137/516.21; 137/516.23; 137/516.13; 137/512.1
[58] Field of Search .............. 137/512.1, 516.11, 137/516.21, 516.13, 516.15, 516.23, 516.17; 251/337

[56] References Cited

U.S. PATENT DOCUMENTS

| | | | |
|---|---|---|---|
| 3,162,699 | 12/1964 | Sivyer | 137/516.11 |
| 3,463,184 | 8/1969 | Kohler | 137/516.11 |
| 4,039,002 | 8/1977 | Broyan | 137/516.17 |
| 4,196,746 | 4/1980 | Broyan | 137/514 |
| 4,249,566 | 2/1981 | Deane | 137/516.11 |
| 4,278,106 | 7/1981 | Cunningham | 137/516.15 |
| 4,289,159 | 9/1981 | Ehemann et al. | 137/454.4 |
| 4,570,666 | 2/1986 | Hartshorn | 137/516.11 |
| 4,601,305 | 7/1986 | Nordskog | 137/528 |
| 4,643,220 | 2/1987 | Hartshorn | 137/516.13 |
| 4,723,572 | 2/1988 | Tuymer | 137/514 |
| 4,854,341 | 8/1989 | Bauer | 137/516.13 |
| 4,924,906 | 5/1990 | Hrabal | 137/516.15 |
| 5,161,565 | 11/1992 | Jamieson | 137/315 |
| 5,203,857 | 4/1993 | Terwilliger et al. | 417/552 |
| 5,238,019 | 8/1993 | Beyer et al. | 137/454.4 |
| 5,247,960 | 9/1993 | Kornfeildt et al. | 137/315 |

Primary Examiner—Denise L. Ferensic
Assistant Examiner—Ramyar M. Farid
Attorney, Agent, or Firm—C. Dean Domingue

[57] ABSTRACT

A novel compressor valve is disclosed. Generally, the valve includes a valve guard containing a flange portion formed thereon. The valve will contain a valve seat adapted to engage the valve guard. The valve contains a first sealing plate and a second sealing plate received within the valve. The first and second sealing plate will cooperate in order to allow flow in only one direction. In the preferred embodiment, the compressor valve further comprises a biasing member adapted for biasing the first sealing plate with the second sealing plate. The first and second sealing plates are removable and may be replaced as a unit.

2 Claims, 4 Drawing Sheets

COMPRESSOR VALVE

BACKGROUND OF THE INVENTION

This invention relates to a compressor valve. More particularly, but not by way of limitation, this invention relates to a novel valve containing replaceable sealing plates.

An important design criteria for compressor valves includes the ability to allow flow of a medium, either gas or liquid, in a first direction only. This is particularly necessary when considering the operation of a compressor which generally requires an inboard stroke, then an outboard stroke. The compressed medium at the higher pressure needs to be transferred through the compressor valve with flow in the opposite direction prohibited. Flow in the opposite direction is precluded due to the design of the compressor valve as is well understood by those of ordinary skill in the art.

Generally, a compressor valve is composed exteriorly by two (2) components bearing such names as a valve seat and valve guard or a stop plate and seat. Internally, the compressor valve is primarily composed of a plate or ring(s) with springs of varying shapes. Over the years, various designs have been advanced in order to effectively make the flow of the medium unidirectional. One such design is disclosed in U.S. No. Pat. 4,196,746 to Seligman which claims holes in a valve seat that are alternated with holes in a plate and guard in such a manner that the former are arranged like white squares on a chess board, and those of the plate and guard like the corresponding black squares.

The operation of the compressor, and in particular, the flow of the medium induced by the stroking of the compressor causes the plate to rise above the valve seat permitting the flow of the medium. The subsequent reduction of pressure from the compressor results in the return of the plate in a discharge valve to its original sealing position against the valve seat. The opposite effect occurs in an intake valve. The striking of the plate against the seat causes deterioration or even breakage of the seat and plate or rings. Upon breakage, the debris may not only scar the valve sealing face, or become lodged within the valve damaging the valve plate and valve seat, but also enters the compressor causing major damage.

Also, due to the repetitive nature of the valve sealing plate striking the valve seat, the sealing face becomes worn through time thereby destroying the seal face making a seal impossible.

Once the seal face is damaged or becomes worn, the operator must remove the compressor valve. The valves normally are repaired by replacing the movable parts and re-machining the face area of the seat. If the valve seat is beyond repair, an entirely new valve seat is required. Since compressors are many times located in remote locations, the time frame for returning to normal operation is long and the procedure for valve replacement becomes very costly. Further, the operator is generally not capable of determining which of the valves in a compressor have malfunctioned resulting in their removing all the valves; thereafter, all the valves are sent to a repair facility.

Thus, the repair and maintenance of compressor valves represents a significant commercial problem. The novel compressor valve herein disclosed solves the problem of damage to the interior parts requiring removal and shipment of the valve to an outside repair facility by allowing for a replaceable inside unit or cartridge which allows for the economical stockpiling of these parts for replacement use by the user.

SUMMARY OF THE INVENTION

A novel compressor valve is disclosed. Generally, the valve includes a valve guard containing a flange portion formed thereon, the valve guard containing means for selective passage of a medium. The valve will contain a valve seat adapted to engage the valve guard with the valve seat containing means for selective passage of a medium. The valve contains a first sealing plate, received within a recess on the valve seat, containing means for selective passage of a medium. The valve further contains a second sealing plate operatively associated with the first sealing plate and received within the valve. The second sealing plate contains means for selective passage of a medium. The first and second sealing plate will cooperate in order to allow flow in only one direction.

In the preferred embodiment, the compressor valve further comprises biasing means for biasing the first sealing plate with the second sealing plate. The valve guard shoulder may engage the first sealing plate so that the first sealing plate is held in a stationary position relative to the valve guard and the valve seat. Means for attaching the valve guard with the valve seat are included.

In one embodiment, the spring means contains a first spring adapted to the outer periphery of the second sealing plate; a second spring adapted to the outer periphery of the second sealing plate; a first brace, adapted to the outer periphery of the first sealing plate, and being integrally formed with the first spring. The placement of the springs or elastic cords may, for example, be on the outside of the plates or via holes bored through both the first and second plate.

In another embodiment, the spring means will include in the first sealing plate an aperture bored axially relative to the valve, and in the second sealing plate another aperture is bored radially and aligned with the aperture of the first sealing plate. A spring is disposed within the axial bore, with the spring having one end being attached to the first sealing plate. A shaft is disposed within the radial bore and the shaft and spring are attached to one another.

In another embodiment, the spring means includes a passageway means for providing a passage through the first sealing plate. The second sealing plate contains an aperture bored radially therein. Also provided will be an elastic means, disposed within the passageway means and aperture, for interconnecting the first sealing plate and the second sealing plate.

In one embodiment, the second sealing plate may consist of a thermoplastic composition, and the first sealing plate consist of a metallic plate. In another embodiment, the first and second sealing plate may consist of metallic plates, or alternatively, the first and second sealing plate may consist of nonmetallic material.

An advantage of the present invention is that the valve can easily be repaired with parts kept at or near the location of the valve itself. Another advantage is that damage to the valve and compressor is reduced all of which will substantially reduce the downtime for the compressor. Yet another advantage is the operator of the valve can more easily determine which of the valves has malfunctioned through usual inspection.

Another advantage includes use of a cartridge that includes sealing plates and biasing means for biasing the sealing plates together. Another advantage is that the cartridge is easy to assemble and install. Another advantage is that the manufacture and assembly of the cartridge can be accomplished at a location remote from the site of the compressor, and then the cartridge can thereafter be shipped to the compressor location. Alternatively, the cartridge can actually be assembled and installed at the compressor location.

Yet another advantage is that a variety of combinations of plates is possible. For instance, a thermoplastic plate may be coupled with a second thermoplastic plate. Alternatively, a thermoplastic plate may be coupled with a metal plate. Yet another combination may be a metal plate with another metal plate.

A feature of the present invention is a removable sealing face eliminating a sealing face that is currently non-replaceable. Another feature includes a first seal face that is located on the removable plates. Another feature includes the cooperating second seal face is also on a removable plate. Yet another feature includes use of a biasing means for biasing the first and second plates together.

Still yet another feature is that one of the sealing plates will be held in a stationary position by the valve guard(s) or other means to fix the plate in a stationary position. Yet another feature includes having a recess provided within a typical valve seat so that the sealing plate may be positioned therein. Still yet another feature includes use of different types of biasing means in order to bias the first sealing plate with the second sealing plate.

DESCRIPTION OF THE PREFERRED EMBODIMENTS

Figure 1:
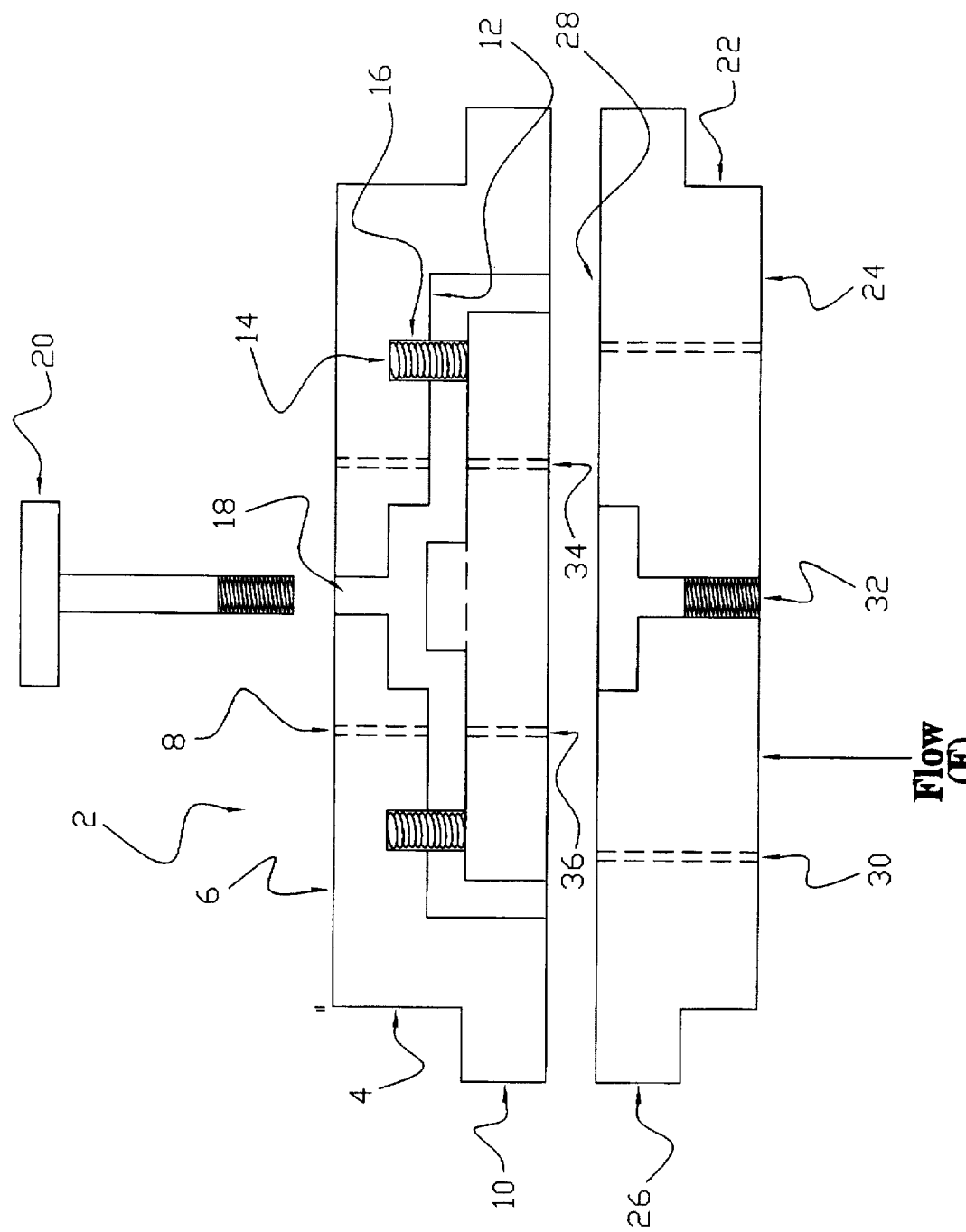
FIG. 1 is a cross-section assembly view of a prior art compressor valve.

Referring now to FIG. 1, a cross-section assembly view of a prior art compressor valve 2 will now be briefly described. Generally, compressor valve 2 contains a valve guard 4 that has a first surface 6 that has a series of ports 8 therein. The first surface 6 extends to a flange member 10 which in turn extends to the inner surface 12. The inner surface 12 has the previously mentioned ports 8 as well as the recesses 14 for placement of the springs 16. The valve guard 4 also has a center opening 18 for placement of the attachment bolt 20.

The valve seat 22 includes an outer surface 24 that extends to a flange and radial shoulder 26, which in turn stretches to the inner surface 28. This level inner radial surface 28 makes up one side of the sealing face of the prior art valves. The surfaces 24 and 28 will have contained therein a series of ports 30. Also included will be the opening 32 for placement of the attachment bolt 20.

The prior art valve 2 will have a plate 34 that will have a series of ports 36 that cooperate with the ports 30 so that when the plate 34 is abutting inner surface 28, no flow is possible. An increase of pressure across ports 30 compress the plate against surface 12 permitting the flow of a medium through ports 30 and into ports 36 and into ports 8. When the pressure on the ports 8 exceeds that at ports 30, the plate 34 will return to its sealing position against inner surface 28 and due to the arrangement of the ports 30 and 36, no flow through is possible as is well understood by those of ordinary skill in the art. Alternatively, a pressure decrease through ports 8 and an increase through ports 30 allows the plate 34 to open thereby releasing the pressure (and flow) through the valve 2.

Figure 2:
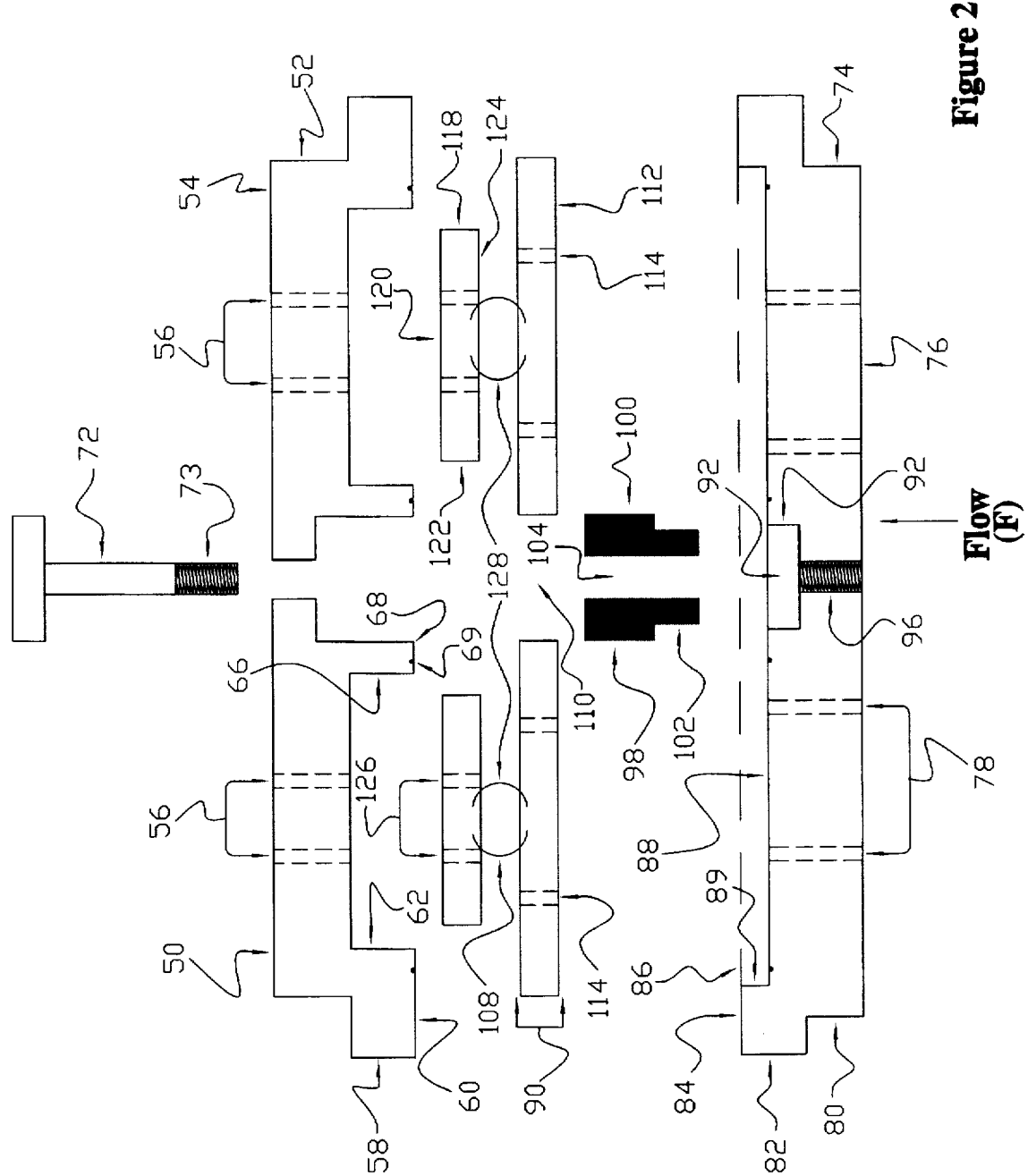
FIG. 2 is a cross-section assembly view of one embodiment of the novel compressor valve.

Referring now to FIG. 2, a cross-section assembly view of the novel compressor valve 50 will now be described. Generally, compressor valve 50 is a circular disc, even though other shapes are applicable to the invention herein described. The compressor valve 50 contains a valve guard 52 that has an outer radial surface 54, with the outer surface containing ports 56. The outer surface 54 will extend to the flange portion 58 having a radial shoulder 60 with a groove for placement of an o-ring 61. The radial shoulder 60 extends to the axial surface 62 which terminates at the inner surface 64. The inner surface will contain the ports 56, with the inner surface terminating at the axial surface 66 which in turn stretches to the radially flat surface 68 that has contained therein a groove for placement of an o-ring 69. The surface 68 stretches to the opening 70 for placement of the attachment bolt 72 that has contained thereon thread means 73.

The valve guard 52 will be attached to the novel valve seat 74 of the present invention. Generally, the valve seat is a circular disc member, even though other shapes are applicable to the invention herein described. The valve seat 74 has an outer radial surface 76 that has disposed therein the ports 78, with the outer radial surface 76 extending to the outer cylindrical surface 80.

The outer cylindrical surface 80 extends to the flange portion 82, with the flange portion containing the radial shoulder 84. The shoulder 84 terminates at the inner cylindrical surface 86 which in turn stretches to the inner radial surface 88. The o-rings 89 will be placed in grooves contained within inner surface 88. It should be noted that the cylindrical surface 86 with the radial surface 88 form a recess for the reception of the first sealing plate 90. The recess thus formed differs significantly from the prior art valve seat 22 since the valve seat 22 contains the level inner radial surface 28.

The inner radial surface will contain the ports 78 previously described. The valve seat 74 also includes the opening 92 which has a first inner diameter 94 that leads to a smaller inner diameter 96 that has thread means disposed therein. A centering device member 98 having a first outer surface 100 that leads to the second (smaller) outer diameter surface 102. The centering device member 98 has an opening 104 for placement of the attachment bolt 72. It should be noted that other types of centering and attachment devices may be used.

The first sealing plate 90 (which may also be referred to as the stationary sealing plate 90) will be adapted to be received within the recess formed by the cylindrical surface 86 with he radial surface 88. As shown in FIG. 2, the sealing plate 90 is generally a cylindrical disc, even though other shapes are possible. The sealing plate has an outer cylindrical surface 106 that leads to a sealing radial surface 108 that in turn extends to the center opening 110. The sealing plate also has a radial surface 112. The first sealing plate will have a series of ports 114 that cooperate with the ports 56 of the valve guard 52 and the valve seat 74, as will be more fully explained in the operation of the invention.

A second sealing plate 116 (which may also be referred to as the movable sealing plate 116) is disclosed, which in the embodiment shown is a circular disc. The second sealing plate 116 will have an outer cylindrical surface 118 that leads to the radial surface 120 which in turn extends to the opening 122. The sealing plate 116 will also contain a radial sealing surface 124 that will cooperate with the sealing face 108 as will be more fully set forth hereafter. The second sealing plate 116 will contain a series of ports 126 which are patterned such that as the first plate and second plate are pressed together thereby forming a seal, the ports 114 and 126 are completely blocked off. In other words, the ports 114 and 126 are staggered such that when the plates 90 and 116 are forced together, the ports 114 and 126 will be blocked off so that no flow through the plates 90 and 116 is allowed.

Also included will be the biasing means 128 for biasing the plates 90 and 116 together. As will be more fully set forth later in the application, different embodiments of the biasing means 128 are possible, with three different embodiments shown in FIGS. 4, 5, and 6. It should be noted that throughout the application, like numbers in the various figures refer to like components.

The sealing plates 90 and 116 may be comprised of different types of materials such as thermoplastic (also refereed to by those of ordinary skill in the art as "Peek"). Alternatively, the plates 90 and 116 may be comprised of metal or other suitable material. It should be noted that the first sealing plate's ports are generally aligned with the ports of the valve seat. Also, the second sealing plate's ports are generally aligned with the ports of the valve guard.

Figure 3:
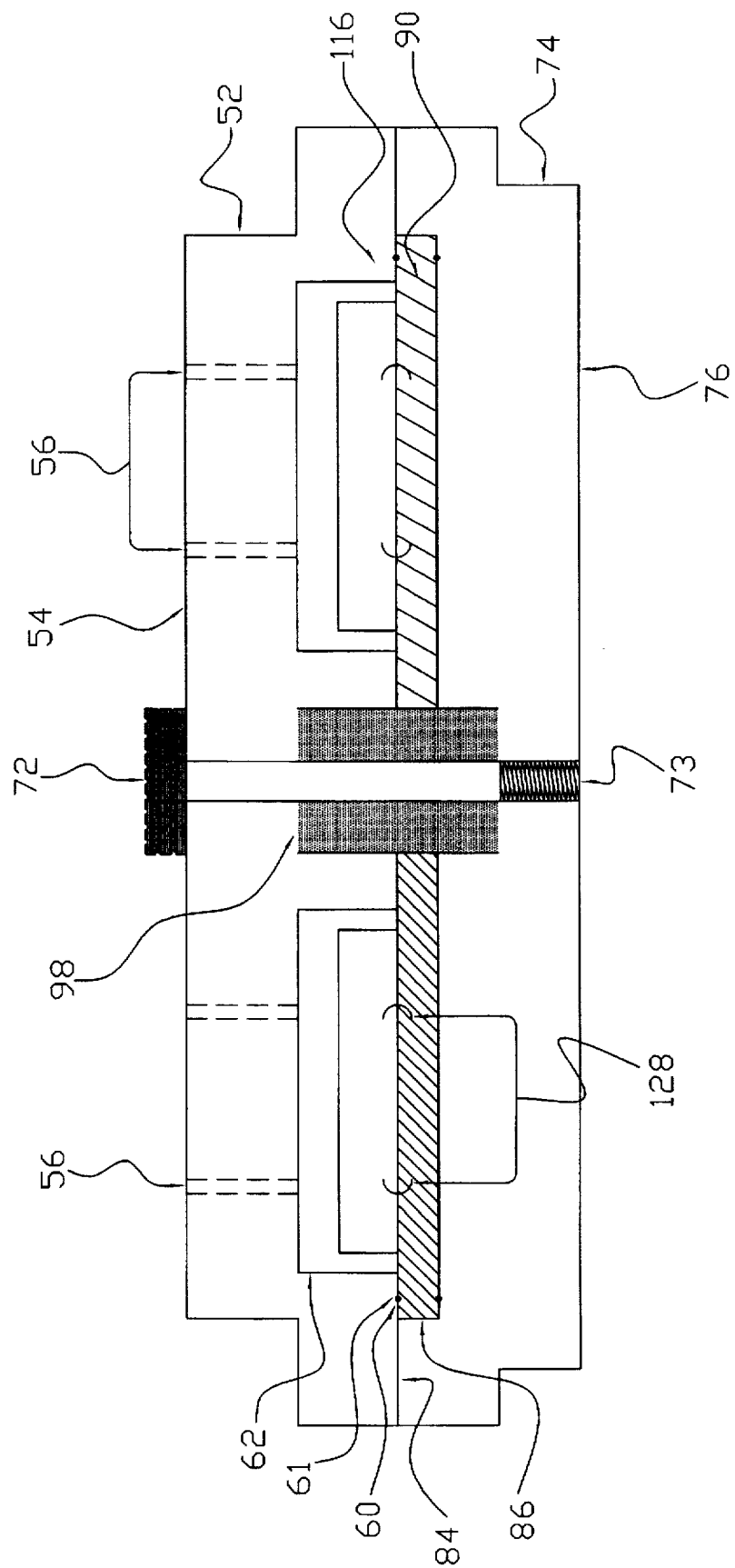
FIG. 3 is a cross-sectional view of the assembled novel compressor valve of FIG. 2.

Referring now to FIG. 3, an assembled view of the novel compressor valve 2 is shown. The valve guard 52 and valve seat 74 are attached together via the attachment bolt 72. The first sealing plate 90 and the second sealing plate 116 are positioned within the recess formed by the valve guard 52 and valve seat 74. The centering device 98 is positioned within the opening 92 so that the sealing plates 90 and 116 are centered within the recess.

The radial shoulder 60 of the valve guard 52 will be seated on the first sealing plate 90, and in particular, on the sealing radial surface 108 of the first sealing plate 90. In this attached position as illustrated in FIG. 3, the first sealing plate 90 will be held in a stationary position during operation. It should be noted that the second sealing plate 116 is biased against the first sealing plate 90 by the biasing means 128.

In operation, the normal flow (F) occurs from the outer radial surface 76 through the ports 78 (sometimes called the intake ports 78) through the ports 114 of the first sealing plate 90 and then through the ports 126 (sometimes referred to as the exhaust ports) of the second sealing plate 116 and through ports 56 of the guard. Remember, in normal operation, the pressure through ports 78 cause the second sealing plate 116 to lift so that flow (F) is possible.

In the situation wherein a back pressure builds up against the outer surface 56, the back pressure will push the second sealing plate 116 up against the first sealing plate 90 so that a seal is formed. The biasing means 128 aids in providing this seal, and the biasing means 128 also assist in allowing a transition period once the pressure builds up against the outer radial surface 76. In other words, once the pressure increases on the surface 76, the biasing means 128 tends to resist the separation of the plates for at least some initial period.

Upon deterioration of the sealing plates, the operator may then change out the entire cartridge which comprises the first and second sealing plate as well as the biasing means 128.

Thus, the replacement of the cartridge could simply include unfastening the attachment bolt 72, withdrawing the valve guard 52, removing the damaged cartridge, and in its position, placing a new cartridge. Thereafter, the valve guard 52 is placed on the valve seat 74 and the attachment bolt 72 is used to fastened the compressor valve together as shown in FIG. 3.

Figure 4:
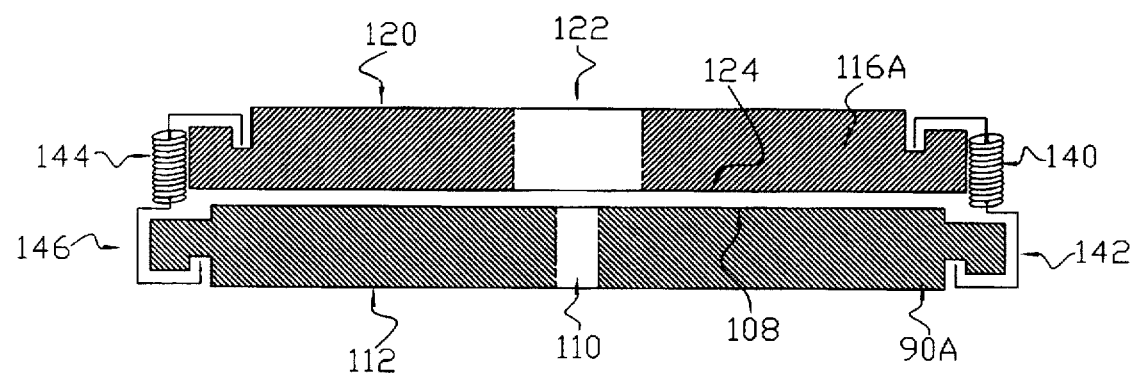
FIG. 4 is a cross-sectional view of one embodiment of the biasing means with sealing plates.

Three different embodiments of the biasing means 128 found in FIGS. 2 and 3 will now be described. Referring now to FIG. 4, which is the preferred embodiment of the biasing means, the first sealing plate 90A and the second sealing plate 116A are biased together with a first spring 140 disposed on the outer periphery of the sealing plate 116A. Integrally formed therewith is the brace member 142 that is positioned on the outer periphery of the first sealing plate 90A.

The biasing means 128 seen in FIG. 4 will also contain a second spring 144 similarly disposed on the outer periphery of the sealing plate 116A. The second spring 144 will be attached to brace member 146, with the brace member 146 being positioned on the outer periphery of the second sealing plate 90A. The centering device 98 will be positioned through the openings 122 and 110. Since the sealing plate 90A will be held stationary by the leg member 60 (as previously described), the sealing plate 116A is biased towards the sealing plate 90A. It should be noted that while conical springs have been depicted, other types of springs may be used.

Figure 5:
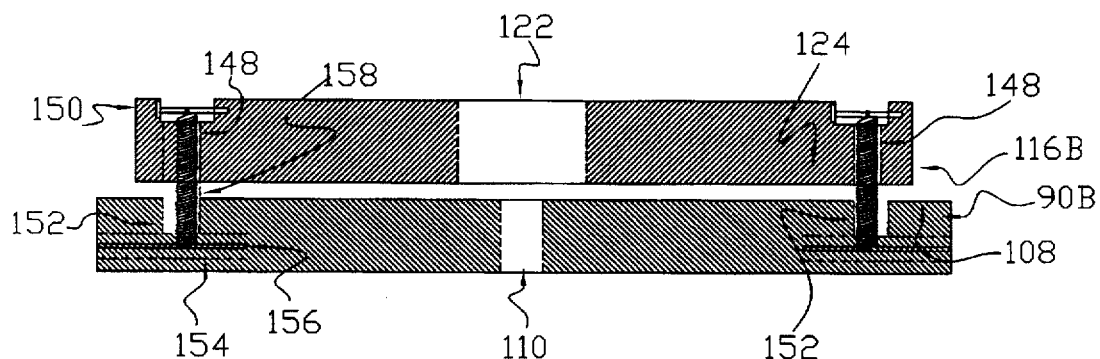
FIG. 5 is a cross-sectional view of a second embodiment of the biasing means with sealing plates.

Referring now to FIG. 5, a second embodiment of the biasing means 128 will be described. The sealing plate 116B will have a series of axial apertures 148 (also refereed to as bores). The axial aperture can conclude with a ledge member 150 at the radial surface 120. The sealing plate 90B may also contain a series of axial apertures 152 that will align with the axial apertures 148. The sealing plate 90B will also contain a radial bore 154 that will contain therein a shaft 156.

The axial apertures 148 will have disposed therein a spring 158 that will at one end be attached to the ledge member 150 and at the second end to the shaft 156. The centering device 98 will be positioned through the openings 122 and 110. Since the sealing plate 90B will be held stationary by the radial shoulder 60 (as previously described), the sealing plate 116B is biased towards the sealing plate 90B.

Figure 6:
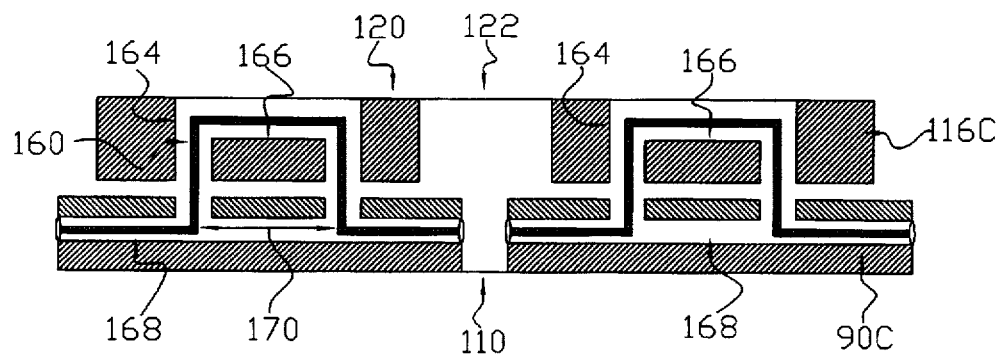
FIG. 6 is a cross-sectional view of a third embodiment of the biasing means with sealing plates.

The third embodiment of the biasing means 128 is illustrated in FIG. 6. The sealing plate 116C will contain passageway means 160 for providing a passageway for an elastic means 162. The passageway means generally comprises axial apertures 164 that are interconnected via a groove 166 formed on the radial surface 120.

The passageway means 160 will further contain within the sealing plate 90C a radial bore 168 and a series of axial apertures 170 that are aligned with the apertures 164 and are also in communication with the radial bore 168. As shown in FIG. 6, the elastic means 162 is thus positioned within the passageway means 160, and more particularly, the elastic means 162 is positioned within the apertures 164, 170, bore 170 and groove 166. The centering device 98 will be positioned through the openings 122 and 110. Since the sealing plate 90C will be held stationary by the leg member 60 (as previously described), the sealing plate 116C is biased towards the sealing plate 90C.

Changes and modifications in the specifically described embodiments can be carried out without departing from the scope of the invention which is intended to be limited only by the scope of the appended claims.

We claim:

1. A valve comprising:

a valve guard containing a flange portion formed thereon with first means for selective passage of a medium;

a valve seat means engaging said valve guard containing second means for selective passage of a medium;

a first sealing plate having a first sealing face thereon, said first sealing plate being, received within said valve seat, containing third means for selective passage of a medium;

a second sealing plate having a second sealing face thereon, said second sealing plate being operatively associated with said first sealing plate and received within said valve guard containing fourth means for selective passage of a medium, and wherein said first sealing face and said second sealing face cooperate to form a seal to a flow;

spring means for biasing said first sealing plate with said second sealing plate so that said first sealing plate and said second sealing plate form a cartridge, and wherein said spring means contains a first end and a second end, with said first end being attached to said first sealing plate and said second end being attached to said second sealing plate;

means for attaching said valve guard with said valve seat;

and wherein said flange engages said first sealing plate so that said first sealing plate is held in a stationary position relative to said valve guard and said valve seat, and said second sealing plate is movable relative to said valve guard and said valve seat;

and wherein said first and second sealing plate contains an aligned aperture bored axially through said second sealing plate, and said second sealing plate contains an aperture bored radially relative to said axial bore, and wherein said spring means contains;

a spring having a first end and a second end, with said spring being disposed within said axial bore, with said spring having said first end being attached to said first sealing plate;

a shaft disposed within said radial bore;

and wherein the second end of said spring is attached with said shaft.

2. A compressor valve for regulating the flow of a medium comprising:

a guard member with a shoulder;

a seat member having a recess therein;

a first valve element having a first sealing surface and contained within said seat member;

a second valve element having a second sealing surface and configured to sealingly engage said first sealing surface of said first valve element;

means for attaching said guard member with said seat member;

biasing means for biasing said first valve element with said second valve element so that said first valve element and said second valve element form a cartridge, and wherein said biasing means has a first end and a second end, with said first end being attached to said first valve element and said second end being attached to said second valve element;

and wherein said shoulder of said guard member engages said first valve element so that said first valve element is held in a stationary position relative to said valve guard and said valve seat, and said second valve element is movable relative to said guard member and said seat member;

exhaust port means, disposed within said guard member, for allowing passage of the medium through said guard member;

intake port means, disposed within said seat member, for allowing passage of the medium through said seat member; and, first flow port means, disposed within said first valve element, for allowing passage of the medium through said seat member;

and second flow port means, disposed on said second valve element, for allowing passage of the medium, and wherein said first flow port and said second flow port are arranged so that as said first valve element is adjacent said second valve element, no passage of said medium is allowed;

and wherein said first sealing plate contains an axial bore therethrough and said second sealing plate contains a second axial bore aligned with said axial bore of said first sealing plate, and said second sealing plate further contains a radial bore formed radially relative to said second axial bore, and wherein said spring means contains:

a spring having a first end and a second end, with said spring being disposed within the axial bore of said first and second sealing plate, with said spring having said first send end being attached to said first sealing plate;

a shaft disposed within said radial bore;

and wherein the second end of said spring is attached with said shaft.

* * * * *